United States Patent [19]

Henke

[11] Patent Number: 4,626,661
[45] Date of Patent: Dec. 2, 1986

[54] AIR DELIVERY SYSTEM FOR AN IMPINGEMENT FOOD PREPARATION OVEN

[75] Inventor: Mitchell C. Henke, Fort Wayne, Ind.

[73] Assignee: Lincoln Manufacturing Company, Inc., Fort Wayne, Ind.

[21] Appl. No.: 601,642

[22] Filed: Apr. 16, 1984

[51] Int. Cl.$^4$ ............................................. F27B 9/10
[52] U.S. Cl. ................................... 219/400; 99/447; 99/443 C; 219/388
[58] Field of Search ............... 219/388, 400, 413; 126/21 A, 15 A; 432/145; 99/386, 447, 443 C, 401; 416/228, 238; 34/48

[56] References Cited

U.S. PATENT DOCUMENTS

| | | | |
|---|---|---|---|
| 1,420,371 | 6/1922 | Emmons | 34/48 |
| 2,212,041 | 8/1940 | Pfautsch | 416/238 |
| 2,616,617 | 10/1949 | Hill | 415/209 |
| 2,841,326 | 6/1954 | Davis | 415/209 |
| 3,549,860 | 12/1970 | Parker | 219/413 |
| 3,568,331 | 1/1961 | Loveday | 34/155 |
| 3,656,469 | 4/1972 | Jung | 126/21 A |
| 3,719,180 | 3/1973 | Pere | 126/21 A |
| 3,978,843 | 9/1976 | Durth | 126/21 A |
| 4,039,278 | 8/1977 | Denholm | 126/21 A |
| 4,059,399 | 11/1977 | Cellier | 432/145 |
| 4,438,572 | 3/1984 | Kaminski | 34/218 |
| 4,462,383 | 7/1984 | Henke et al. | 126/21 A |
| 4,492,839 | 1/1985 | Smith | 126/21 A |
| 4,523,391 | 6/1985 | Smith et al. | 219/400 |

FOREIGN PATENT DOCUMENTS

| | | | |
|---|---|---|---|
| 2233610 | 1/1973 | Fed. Rep. of Germany | 219/209 |
| 3033685 | 3/1981 | Fed. Rep. of Germany | . |
| 1515884 | 3/1968 | France | 126/21 A |
| 276654 | 10/1951 | Switzerland | 126/21 A |
| 439249 | 12/1935 | United Kingdom | 416/239 |
| 601160 | 4/1948 | United Kingdom | 416/228 |
| 2078365 | 1/1982 | United Kingdom | 126/21 A |

Primary Examiner—E. A. Goldberg
Assistant Examiner—Teresa J. Walberg
Attorney, Agent, or Firm—Jeffers, Irish & Hoffman

[57] ABSTRACT

An improved air delivery system is provided for an impingement food preparation oven including a plurality of air ducts disposed in a cooking chamber, a plenum connected to the air ducts, and a scoop-type fan disposed in a backwall opening of the plenum to provide a flow of heated air smoothly and uniformly through the plenum into the air ducts. The fan device includes a plurality of tear-drop shaped blades, wherein each blade has a leading edge portion that tapers to a point in the direction of rotation and a trailing row portion at a given pitch angle for forcibly moving the flow of air in an axial direction toward the plenum front wall. The plenum front wall has a plurality of openings connected to the duct members, and a multi-tapering surface tapering from the front wall openings inwardly of the plenum toward the fan, whereby the axially directed flow of heated air from the fan is smoothly and uniformly directed by the multi-tapering surface to the plurality of air ducts, thereby providing a uniform cooking temperature in the cooking chamber.

14 Claims, 16 Drawing Figures

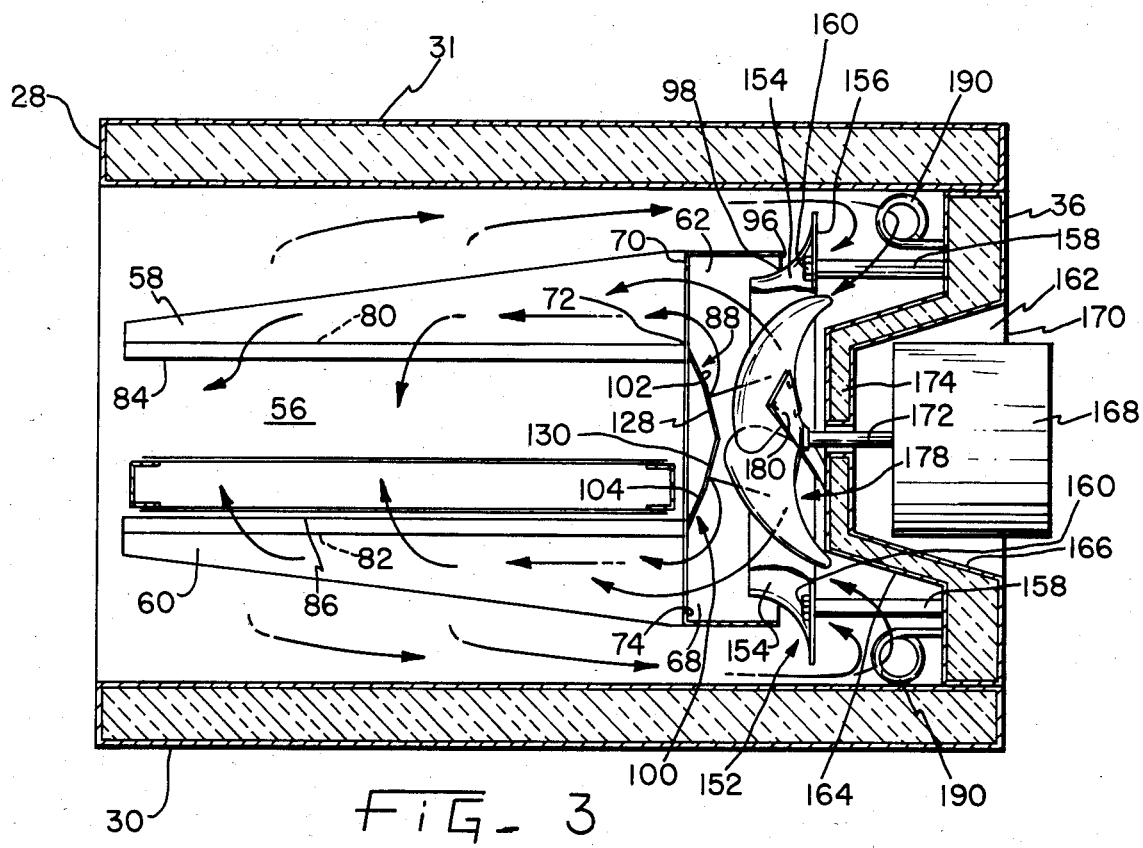

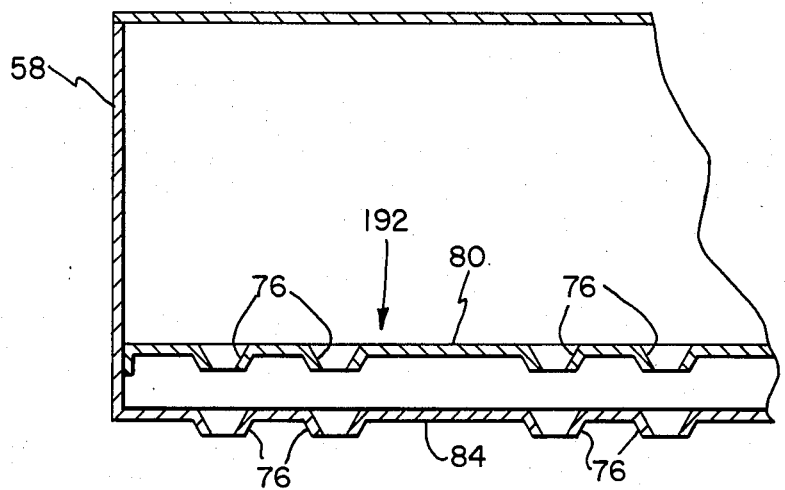
FIG-8
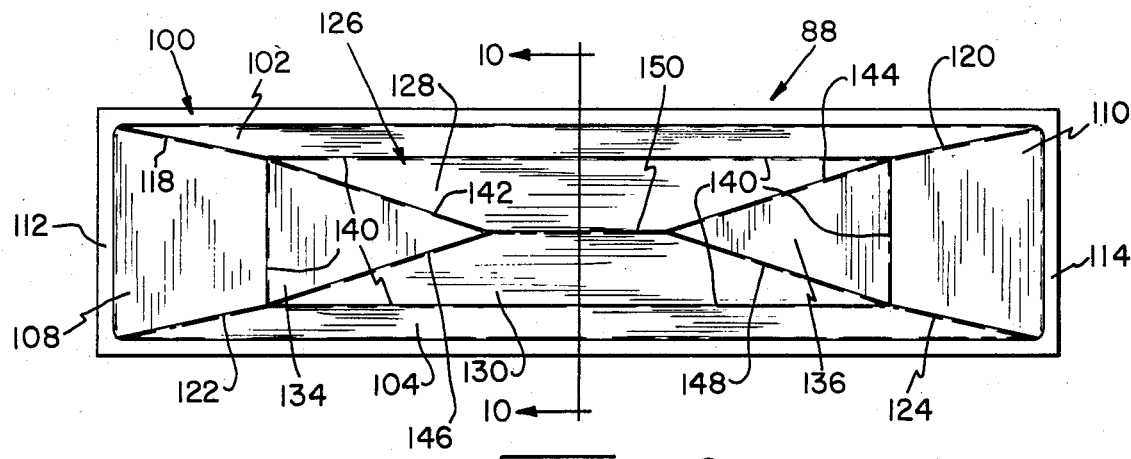
FIG-9
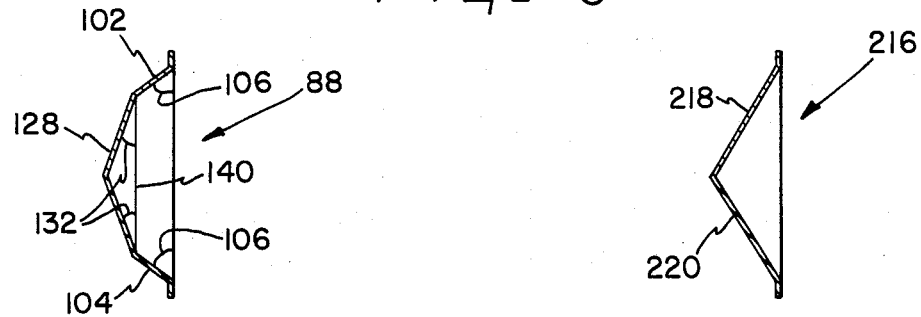
FIG-10    FIG-11
FIG-12

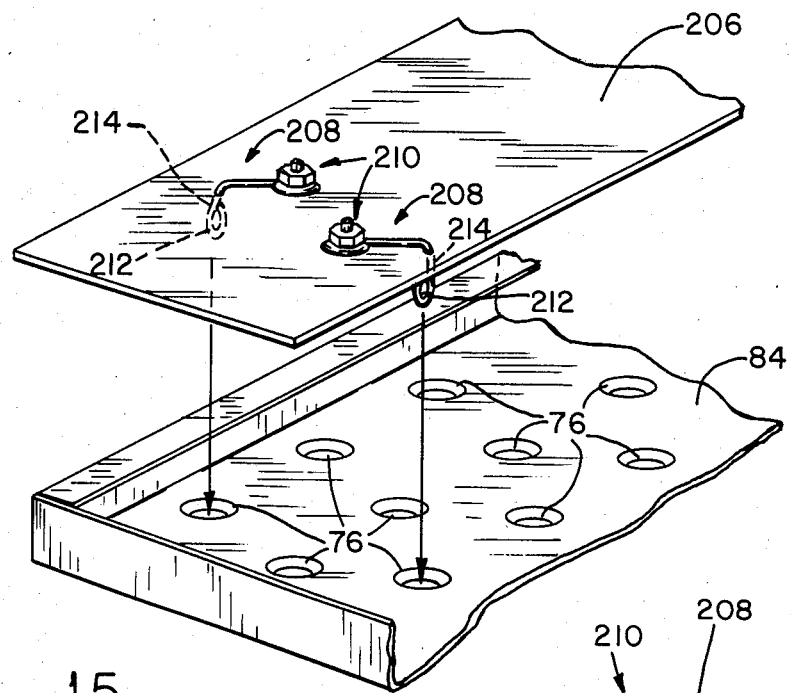
FIG. 15
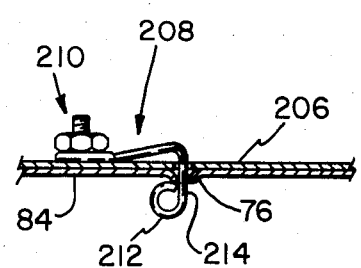
FIG. 16
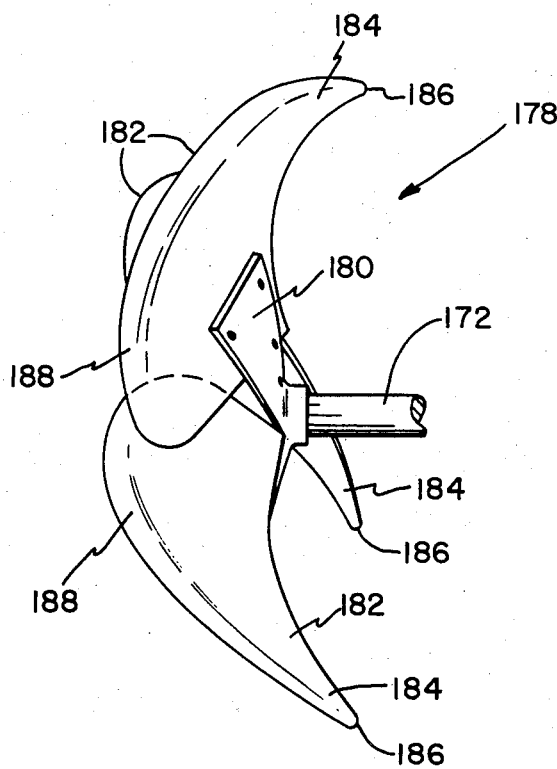
FIG. 14
FIG. 13

AIR DELIVERY SYSTEM FOR AN IMPINGEMENT FOOD PREPARATION OVEN

BACKGROUNG OF THE INVENTION

This invention pertains to an impingement food preparation oven, and more particularly to an improved air delivery system for an impingement food preparation oven for providing uniform cooking temperatures for a food product.

Typically, an impingement food preparation oven comprises an enclosure having a cooking chamber with a food support member therein, and a plurality of heat ducts generally disposed above and below the support member for directing a flow of heated air against the food product. The flow of heated air is supplied to the air ducts through their respective openings by a plenum, and a fan device is disposed within an opening of the plenum for directing the flow of heated air therein. Heating elements are provided for heating the air before being drawn by the fan into the plenum.

Naturally, one of the objects of an oven is to provide a uniform cooking temperature for evenly cooking a food product therein, and this object is primarily a function of the flow of heated air within the oven enclosure. A problem too often occurring with some prior art ovens is their inability to provide proper air flow to evenly cook a food product, and generally several factors are the cause thereof. One of these factors is the use of a paddle-type fan for drawing air from the enclosure into the plenum. These types of fans move the air in a rotating fashion with some axially directed movement, but with a greater portion of the movement being radially directed. Since the fan is mounted generally facing the front wall openings in the plenum, which are connected to the air ducts, the direction of flow of air is not satisfactorily axially directed from the fan to the ducts. Further, since the radial velocity component of the air flow tends to be greater than the axial velocity component, air buffeting is developed within the plenum caused by a succeeding fan paddle hitting or contacting the air volume moved by a preceding fan paddle. This buffeting of air also results in a less than desirable air flow through the plenum, and is also a source of undesirable noise during operation of the oven.

Another factor affecting the desired air flow is the front wall of the plenum, which is in some cases a flat surface facing towards the fan. The flat surface of the plenum front wall tends to retard the flow of air through the plenum, thereby creating an undesirable build up of static pressure therein. This static pressure does not allow for a smooth dynamic flow of air from the fan through the plenum and to the air ducts, but instead tends to rather push the air from the plenum into the air ducts. Moreover, this static pressure not only prevents smooth air flow, but also causes the plenum to be a source of heat loss due to the pressure buildup therein.

In some prior art ovens, the plenum front wall is provided with a single tapering surface that tapers from the front wall opening inwardly of the plenum toward the fan. This type of plenum front wall is intended to evenly distribute a flow of air directed thereagainst into the air ducts. However, when used in conjunction with the above-described paddle-type fan, the tapering surface is not completely effective in dividing a swirling or rotating air flow into the air ducts.

Thus, the above plenum and fan assemblies in the prior art ovens generally do not provide an equal distribution of heated air to the ducts, thereby resulting in unsatisfactory heat distribution through the air ducts and an unevenly cooked food product. Further, since the heat of the flow of air from the air ducts is not evenly or uniformly distributed, those ovens utilizing a conveyor assembly to convey a food product through the cooking chamber do not have the versatility of operating the conveyor in both a left-to-right and right-to-left directions for cooking.

SUMMARY OF THE INVENTION

The present invention eliminates the problems and disadvantages of the above prior art ovens by providing an improved air delivery system for an impingement food preparation oven.

The impingement food preparation oven of the present invention includes in one embodiment thereof an enclosure having a cooking chamber therein and a plurality of heat ducts disposed in the cooking chamber for directing a flow of heated air against a food product supported therein. A plenum is provided having a front wall with openings connected to the air ducts and a backwall having a back opening with a ring member mounted therein. The ring member has a peripheral sidewall that curves radially outwardly toward the plenum front wall, and a scoop-type fan is rotatably mounted within the peripheral sidewall. The fan has a plurality of generally tear-drop shaped blades thereon, and each blade has a leading edge portion that tapers to a point in the direction of rotation and a trailing row portion disposed at a given pitch angle in the direction of the plenum front wall. Because of the design of the blades, upon rotation of the fan, a flow of air is created primarily in the axial direction. This axially directed flow of air is caused by each blade leading edge portion scooping a separate volume of air and its respective trailing row portion forcibly throwing or moving the air in an axial direction due to its given pitch angle. Thus, the flow of air is primarily axially directed toward the plenum front wall, thereby resulting in a smoother flow of heated air from the fan through the plenum. Moreover, the blades are designed and arranged on the fan spider such that a succeeding blade leading edge portion does not contact the separate volume of air moved by the preceding blade trailing row portion, thereby eliminating buffeting of air within the plenum and the noise associated therewith. The ring member, within which the fan is disposed, complements the effects of the fan by providing the peripheral sidewall that curves radially outwardly toward the plenum front wall to properly deliver, in conjunction with the scoop-type fan, the desired axial flow of air through the plenum to the air ducts.

The plenum is provided with a front wall having openings connected to the air ducts and a tapering deflector surface that tapers from the front wall openings inwardly of the plenum toward the fan. The tapering deflector surface smoothly and uniformly directs the axial flow of air from the fan into the air ducts. This dynamic flow of heated air provided by the scoop-type fan and tapering deflector surface eliminates the significant build up of static pressure in the plenum and an accompanying heat loss associated therewith, and reduces noise of the air flow in the plenum.

Thus, the smooth flow of heated air through the plenum and its uniform distribution into the air ducts results in a uniform distribution of heat by the air duct nozzles and an evenly cooked food product. Further, since there is uniform cooking temperature distribution within the cooking chamber, those ovens utilizing a conveyor assembly can convey a food product in either direction through the oven and obtain a desired cooked product.

In one form of the invention there is provided an impingement food preparation oven comprising an enclosure including a cooking chamber for cooking a food product therein, and a support member in the cooking chamber for supporting the food product. A plurality of duct members are mounted in the cooking chamber and spaced apart from the support member, and include a respective plurality of nozzles positioned to direct a plurality of streams of air toward the support member. A plenum has a front wall with a plurality of openings connected to the respective duct members and a backwall with an opening therein, and a heating element is provided to heat the air flowing into the plenum. A ring member having a peripheral sidewall is mounted in the backwall opening, and a rotatable scoop-type fan is mounted within the ring member. The scooptype fan has a plurality of generally tear-drop shaped blades, wherein each blade has a leading edge portion that tapers to a point in the direction of rotation and a trailing row portion disposed at a given pitch angle for axially directing a flow of air to the plenum front wall. The plenum front wall further includes a surface tapering from the front wall openings inwardly of the plenum and toward the fan for smoothly and uniformly directing the flow of heated air from the fan into the duct members and the nozzles, thereby providing a uniform cooking temperature for the food product.

In another form of the invention there is provided an impingement food preparation oven comprising an enclosure including a cooking chamber for cooking a food product, and a support member in the cooking chamber for supporting the food product. A plurality of duct members are mounted in the cooking chamber and have a respective plurality of nozzles to direct a respective plurality of streams of air therefrom. At least one of the duct members is spaced above the support member and at least one other duct member is disposed below the support member. A plenum is provided having a front wall with a plurality of openings connected to the duct members and a backwall with an opening therein; the plenum front wall further having a multi-tapering surface tapering from the front wall openings inwardly of the plenum. The multi-tapering surface has a tapering peripheral portion and a tapering center portion, wherein the tapering peripheral portion is at a greater inclination toward the front wall openings than the tapering center portion. A heating element is provided in the enclosure for heating the flow of air, and a ring member having a peripheral sidewall is mounted in the backwall opening. A rotatable fan is disposed in the peripheral sidewall of the ring member for drawing a flow of heated air from the enclosure into the plenum toward the multi-tapering surface, which smoothly and uniformly directs the flow of heated air from the fan into the duct members substantially along there longitudinal axes and out the nozzles, thereby providing a uniform cooking temperature for the food product.

It is an object of the present invention to provide an improved air delivery system for an impingement food preparation oven.

Another object of the present invention is to provide an improved air delivery system for an impingement food preparation oven having a scoop-type fan with a plurality of generally tear-drop shaped blades, wherein each blade has a leading edge portion tapering to a point in the direction of rotation and a trailing row portion at a given pitch angle for axially directing the flow of air into a plenum.

Yet another object of the present invention is to provide an improved air delivery system for an impingement food preparation oven wherein the plenum front wall has a tapering deflector surface that tapers from the front wall openings inwardly of the plenum to smoothly and uniformly direct a flow of air into air ducts connected to the front wall opening.

A further object of the present invention is to provide an improved air delivery system for an impingement food preparation oven wherein the plenum front wall has a multi-tapering deflector surface tapering from the front wall openings inwardly of the plenum to smoothly and uniformly direct a flow of air substantially along the longitudinal axes of air ducts connected to the front wall openings.

Further objects of the present invention will appear as the description proceeds.

BRIEF DESCRIPTION OF THE DRAWINGS

The above-mentioned and other features and objects of this invention, and the manner of attaining them, will become more apparent and the invention itself will better be understood by reference to the following description of an embodiment of the invention taken in conjunction with the accompanying drawings, wherein:

FIG. 3 is a fragmentary and broken-away side elevational view of the embodiment in FIG. 1;

FIG. 4 is a front elevational view of the fan of the preferred embodiment in FIG. 1;

FIG. 8 is an enlarged fragmentary and broken-away elevational view of an air duct;

FIG. 9 is an elevational view of a multi-tapering deflector surface for the plenum front wall in the embodiment in FIG. 1;

FIG. 10 is a sectional view of FIG. 9 taken along lines 10—10 and viewed in the direction of the arrows;

FIG. 11 is a sectional view of FIG. 5 taken along lines 11—11 and viewed in the direction of the arrows;

FIG. 12 is a plan view of the multi-tapering deflector surface in FIG. 9;

FIG. 13 is a sectional view of FIG. 4 taken along line 13—13 and viewed in the direction of arrows;

FIG. 14 is an elevational view of the fan in FIG. 4;

FIG. 15 is an enlarged fragmentary and broken-away view of the outer nozzle plate of an air duct and a cover plate spaced thereapart; and FIG. 16 is an enlarged fragmentary and broken away view of the cover plate attached to the air duct in FIG. 15.

DESCRIPTION OF A PREFERRED EMBODIMENT

Figure 1:
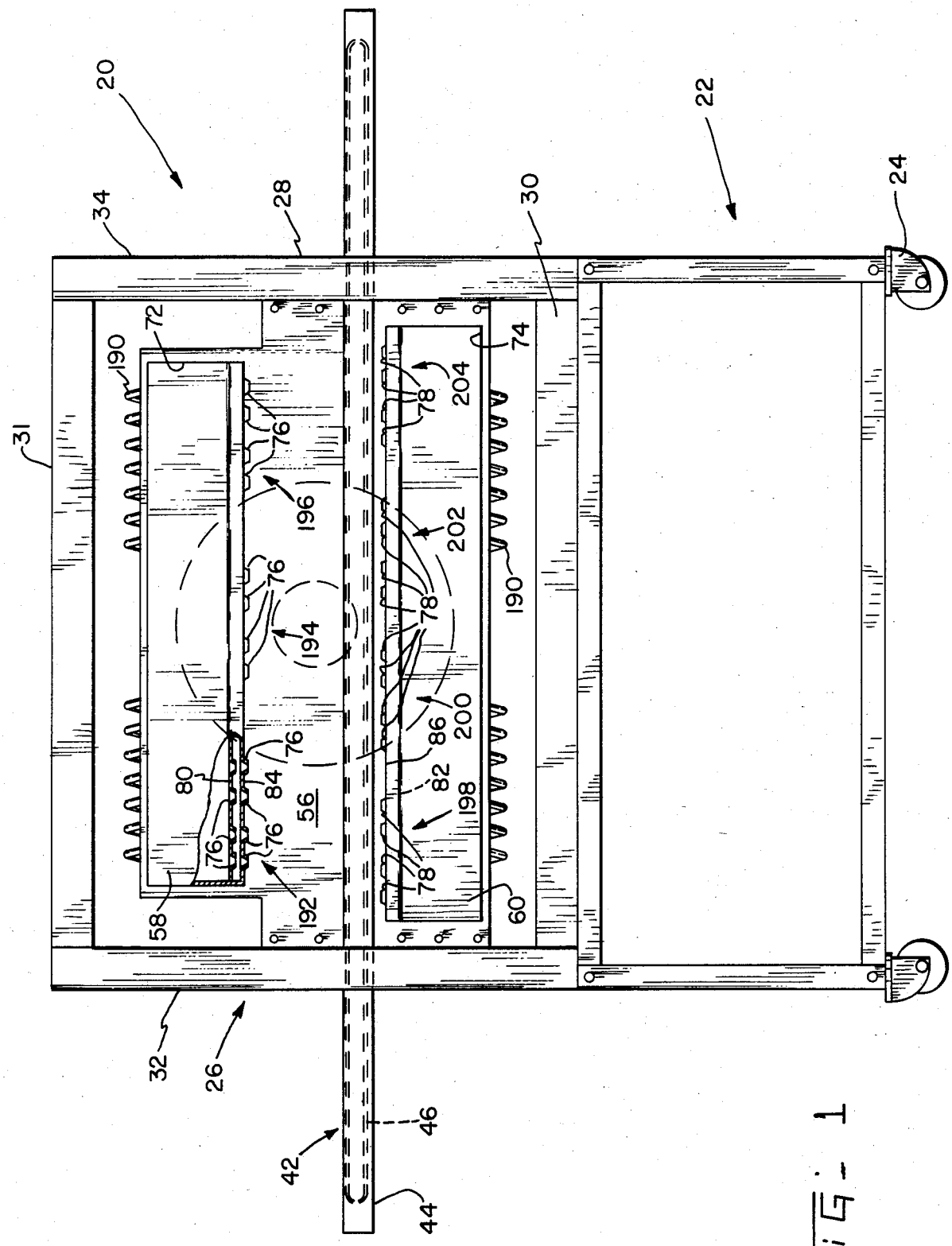
FIG. 1 is a partially broken-away front elevational view of an impingement food preparation oven incorporating a preferred embodiment of the present invention.
Figure 2:
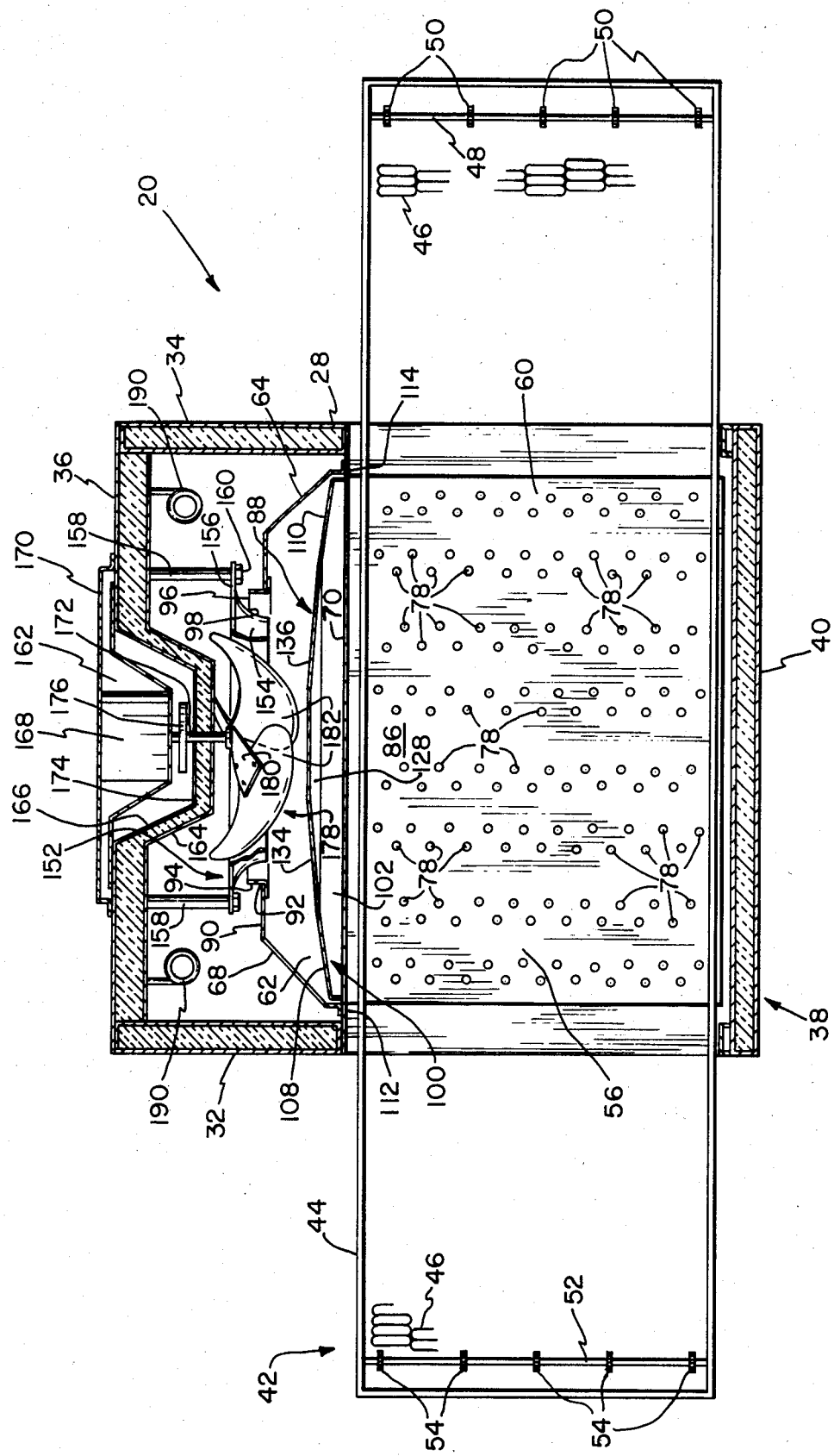
FIG. 2 is a fragmentary and broken-away top elevational view of the oven in FIG. 1.

Referring primarily to FIGS. 1, 2, and 3, impingement food preparation oven 20 is illustrated comprising stand assembly 22 movably mounted on casters 24 and cabinet assembly 26 mounted on stand assembly 22. A more detailed description of stand assembly 22 as well as the manner of connections and attachments hereinafter described, is more fully provided in U.S. patent application Ser. No. 386,609, filed on June 9, 1982, and which is incorporated by reference herein. Cabinet assembly 26 includes enclosure 28 comprising insulated bottom wall 30, insulated top wall 31, insulated side walls 32,34, insulated backwall 36, and door assembly 38 having insulated door 40 hingedly connected thereto. A more detailed description of a typical door assembly 38 can be found in the aforementioned U.S. patent application Ser. No. 386,609.

A conveyor assembly 42 is horizontally disposed through passageways (not shown) in side walls 32,34, and comprises a conveyor frame 44 supporting a movable continuous belting 46 driven by means of drive shaft 48 with gears 50 and idler shaft 52 with gears 54. Drive shaft 48 can be driven by any suitable means, such as an electric motor (not shown).

Figure 7:
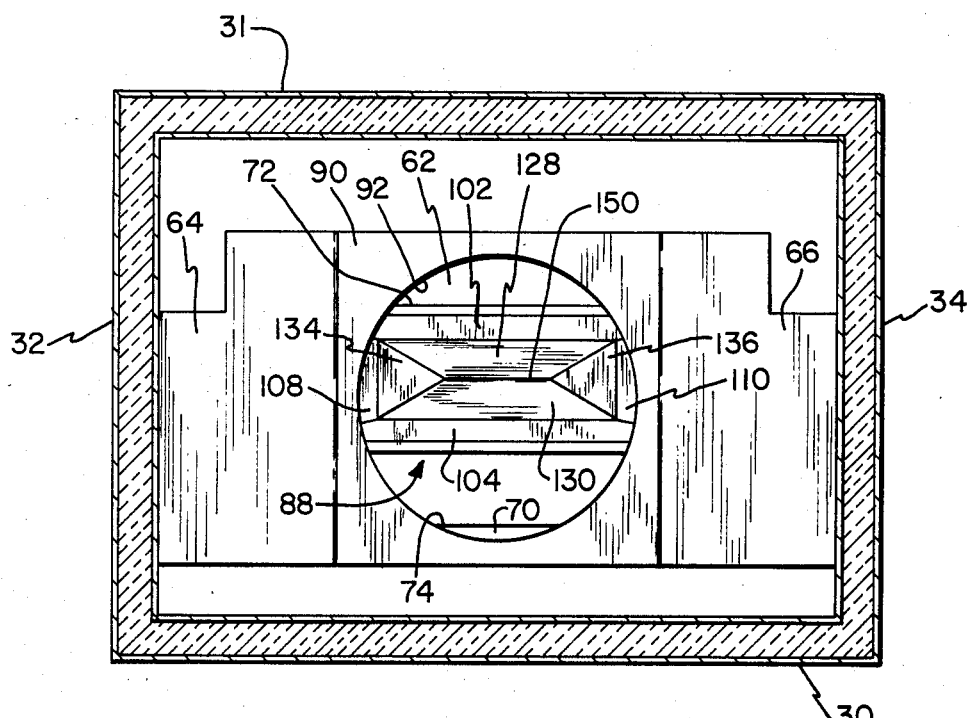
FIG. 7 is a broken-away elevational view looking through the plenum backwall opening at a plenum front wall multi-tapering deflector surface of the embodiment in FIG. 1.

Enclosure 28 further includes a cooking chamber 56, in which conveyor assembly 42 is horizontally disposed, and elongated air duct 58 spaced above conveyor assembly 42 and elongated air duct 60 spaced below conveyor assembly 42. Air ducts 58,60 are connected to plenum 62 for receiving a flow of heated air therefrom. Plenum 62 includes a tapering sidewall 64 (FIG. 2) connected to one end of front mounting wall 70, which extends between side walls 32,34, and tapering sidewall 68 connected to the other end of front mounting wall 70. Front wall 70 has a top opening 72 and a bottom opening 74 (FIGS. 3 and 7), and to which the open ends of air ducts 58,60 are respectively connected. It should be noted that front wall 70 is spaced apart from top wall 31 and bottom wall 30 as illustrated in FIGS. 1 and 3. A more detailed description of a suitable means of mounting air ducts 58,60 and plenum 62 in enclosure 28 can be found in U.S. patent application Ser. No. 386,609.

Referring now to FIGS. 1, 2, 3, and 8, air duct 58 has a plurality of nozzles 76 directed downwardly towards conveyor assembly 42 and air duct 60 has a plurality of nozzles 78 directed upwardly toward conveyor assembly 42. Nozzles 76,78 are designed to direct streams of columnated air against a food product conveyed by assembly 42. To provide the columnated jets of air, air ducts 58,60 include respective inner nozzles plates 80,82 spaced apart from respective outer nozzles plates 84,86. As illustrated in FIG. 8, inner nozzle plates 80,82 and outer nozzle plates 84,86 are spaced apart to provide columnated jets of air through their respective aligned nozzles 76,78.

Referring now to FIGS. 1, 2, 3, 7, 9, 10, and 12, plenum 62 includes backwall 90 having opening 92 disposed therein. A cylindrical collar or sleeve 94 is mounted in opening 92 and includes an annular flange 96 extending radially inwardly of opening 92 to form a second backwall opening 98.

Front wall 70 of plenum 62 includes a multi-tapering reflector surface 88 between openings 72,74 and which tapers from openings 72,74 inwardly of plenum 62 and toward backwall opening 98.

Referring now primarily to FIGS. 7, 9, 10, and 12, one-piece deflector surface 88 comprises a tapering peripheral portion 100 having a flat top section 102 and a flat bottom section 104 respectively leading from openings 72,74 at a first angle indicated at 106 and oppositely disposed flat side sections 110 leading respectively from front wall side portion 112 and side portion 114 at a second angle indicated at 116. Top section 102 meets side sections 108,110 along respective form lines 118,120; and bottom section 104 meets side sections 108,110, along respective form lines 122,124.

Deflector surface 88 further includes tapering center portion 126 having a flat top section 128 and a flat bottom section 130 respectively leading from top section 102 and bottom section 104 at a third angle indicated at 132, wherein third angle 132 is less than first angle 106; and oppositely disposed side sections 134,136 respectively leading from side section 108 and side section 110 at a fourth angle indicated at 138, wherein fourth angle 138 is less than second angle 116. Tapering center portion 126 and tapering peripheral portion 100 meet at a generally rectangular juncture 140, and top section 128 meets side sections 134,136 along respective form lines 142,144 and bottom section 130 meets side sections 134,136 along respective form lines 146,148. Top section 128 and bottom section 130 of center portion 126 meet at form line 150.

Referring now to FIGS. 2 and 3, a ring member 152 having a peripheral sidewall 154 and an annular flange portion 156 is tightly fitted in opening 98 such that a virtually air-tight fit exists between annular flange 96 and peripheral sidewall 154. Ring member 152 is secured in place by mounting annular flange portion 156 on four studs 158, which have threaded end portions received through openings (not shown) in annular flange portion 156 and nuts 160 threaded thereon. Studs 158 extend inwardly from backwall 36 so as to properly mount ring member 152 in opening 98.

Back wall 36 has a frusto-conically shaped cavity 166 formed therein to provide internal motor shroud 164 and external motor shroud 166 for housing motor 168 secured to mounting bracket 170 (FIG. 2) of backwall 36. Motor 168 has a motor shaft 172 rotatably extending through the inwardly extending portion 174 formed by cavity 162 in backwall 36. A heat conductor 176 is secured to motor shaft 172 between motor 168 and portion 174 for absorbing heat from motor 168.

Referring now to FIGS. 2, 3, 4, and 14, scoop-type fan 178 is secured to the remote end of motor shaft 162 by spider 180. Fan 178 is made of a stainless steel material to permit it to satisfactorily operate an an RPM of approximately 3000 and at temperatures of approximately 600° F. Fan 178 includes three blades 182 secured to spider 180, and each blade 182 is of generally tear-drop shape. Each blade 182 includes a leading edge portion 84 generally defined between points A and B (FIG. 4) and which tapers to a point 186 in the direction of rotation, which in FIG. 4 is a clockwise rotation. Each blade 182 further includes a trailing row portion 188 generally defined peripherally between points B and C. Each blade 182 is relatively flat in its area near point 186 and smoothly increases in pitch angle from point B to point D. The pitch angle remains relatively constant between points D and C, but may also be allowed to increase in pitch between points B and C if desired. The maximum preferred pitch angle is between approximately 23° and about 25°. The uniqueness of using a fan such as scoop-type fan 178 in impingement food preparation oven 20 will be described hereinafter.

Heating of the air flow within enclosure 28 is provided by heating coils 190 supported on backwall 36 and disposed behind and about fan 178. Heating coils 190 can be electrically operated in any suitable manner.

Referring to FIGS. 1, 2, 15, and 16, nozzles 76 are arranged in three sections 192,194 and 196 in air duct 58, wherein each section 192,194,196 includes four rows of nozzles 76 extending the length of air duct 58. In a similar manner, air duct 60 includes four sections 198,200,202 and 204 of nozzles 78, each section 198,200,202,204 containing four rows of nozzles 78 extending the length of air duct 60. If it is desired to shut off the stream of heated air through any of the nozzles 76,78 in air ducts 58,60, a cover plate 206, which can be of any desired size and shape, is placed over the selected nozzles to be shut off and removably attached thereto by locking pins 208 received in nozzles 76 as illustrated in FIGS. 15 and 16. Locking pins 208 are secured to cover plate 206 by respective nut and bolt assemblies 210, and each locking pin 208 has a remote end formed as a loop having a diameter slightly greater than the diameter of nozzles 76,78 such that the end snaps into place through nozzle 76 to removably secure cover plate 206 against inner nozzle plate 80. Each locking pin 208 also includes a shank portion 214 having a predetermined length to ensure cover plate 206 remains firmly against nozzle plate 80, thereby preventing any vertical movement of cover plate 206 relative to plate 80.

Figure 5:
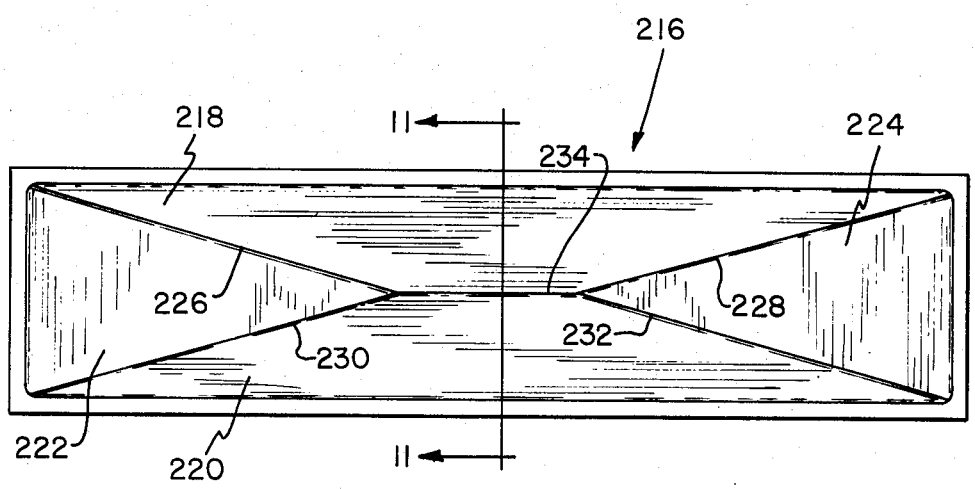
FIG. 5 is an elevational view of a modification of a plenum front wall tapering deflector surface.
Figure 6:
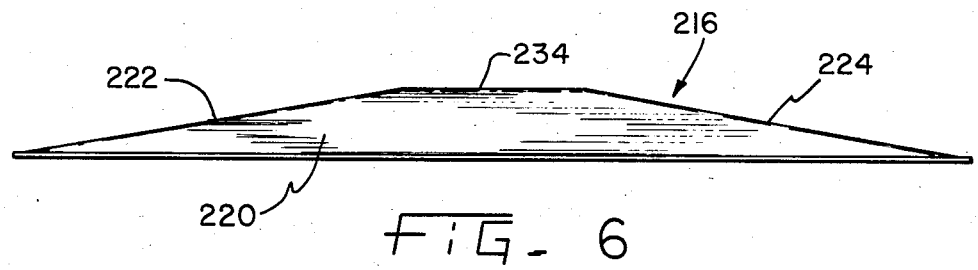
FIG. 6 is a plan view of the deflector surface in FIG. 5.

Referring now to FIGS. 5, 6, and 11, a modification of deflector surface 88 is illustrated as a single tapering deflector surface 216 comprising a flat top portion 218 and a flat bottom portion 220, which if forming a part of front wall 70 taper from openings 72,74 inwardly of plenum 62, and a pair of oppositely disposed side portions 222,224 that taper inwardly from front wall side portions 112,114, respectively, inwardly of plenum 62. Top portion 218 meets side portions 222,224 at respective form lines 226,228, and bottom portion 220 meets side portions 222,224 at respective form lines 230,232 and top portion and bottom portion meet at juncture 234.

The present invention also contemplates either deflector surface 88 or deflector surface 216 having arcuately shaped surfaces rather than flat surfaces. Hence, the use of the word "taper", or variations thereof, include in the present invention an arcuately shaped or flat surface.

In operation, rotation of fan 178 by motor 168 causes air to circulate within enclosure 28 as indicated in arrows in FIG. 3. Because of the smooth and uniform flow of heated air created by fan 178 through ring member 152, plenum 62, and nozzles 76,78 in air ducts 58,60, respectively, a uniform cooking temperature is provided against a food product being conveyed by conveyor assembly 42. The flow of heated air into and out of plenum 62 does not create a significant buildup of static pressure therein, along with an accompanying heat loss, but is rather a dynamic air flow continuously moving through plenum 62 and into air ducts 58,60 due to the design of fan 178, ring member 152, and plenum 62. Referring to FIGS. 4 and 14, each blade 182 scoops a substantially separate volume of air and forcibly moves it in an axial direction toward deflector surface 88, and because of the design of each blade 182, a succeeding blade 182 does not contact the volume of air moved by a preceding blade 182, and instead scoops another separate volume of air to be forcibly moved axially. This axially directed air flow provides a more dynamic flow of heated air through plenum 62, thereby eliminating most heat loss associated with the above-described prior art ovens, and reduces the noise created by the flow of air being buffeted in plenum 62. The leading edge portion 184 of each blade 182 bites or scoops a volume of air, and upon continued rotation of blade 182, the trailing row portion 188 having a pitch angle between about 23°–25° forcibly directs or moves that volume of air axially forward. The smooth and uniform flow of the heated air is further assisted by curved peripheral sidewall 154 of ring member 152. The curvature of peripheral sidewall 154 serves to smoothly guide and direct the air towards deflector surface 88.

Referring to FIGS. 2 and 3, multi-tapering deflector surface 88 smoothly and uniformly guides the air to a plurality of air ducts, such as air ducts 58,60. The flow of air does not actually impact the deflector surface 88, but because of a pressure area developed along form line 150 (FIG. 9), the air flow is smoothly diverted along tapering sections 128,130,134,136. As the flow of air passes over the generally rectangular shaped juncture 140 between tapering center portion 126 and tapering peripheral portion 100, it is drawn downwardly along tapering sections 102,104,108, and 110 because of a developed low pressure area at juncture 140. Thus, the flow of heated air over deflector surface 88 follows a gently curving path, rather than a straight and angular path. Because of the greater inclination of tapering peripheral portion 100 relative to tapering center portion 126, the flow of heated air is turned or guided into air ducts 58,60 substantially along their longitudinal axes. This provides the desired alignment between the direction of heated air flow and air ducts 58,60 resulting in a flow of heated air through nozzles 76,78 that provides a uniform cooking temperature to a food product being conveyed by conveyor assembly 42. Side sections 134,136,108, and 110 direct a portion of the heated air flow to the corners and sides of air ducts 58,60 to ensure uniform distribution of air flow along the width of ducts 58,60.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. An impingement food preparation onve, comprising:
    an enclosure ncluding a cooking chamber adapted for cooking a food product therein,
    means in said cooking chamber adapted for supporting a food product,
    a plurality of duct members mounted in said cooking chamber and spaced apart from said supporting means, said duct members including a plurality of nozzles positioned to direct a plurality of streams of air toward said supporting means, at least one said duct member being spaced above said supporting means with its respective said nozzles directed downwardly toward said supporting means, and at least one other said duct member being spaced below said supporting means with its respective said nozzles directed upwardly toward said supporting means, a pleunum in said enclosure and connected to said duct members to provide a flow of air thereto, said plenum having a front wall with a plurality of openings connected to respective said duct members and a back wall with an opening therein, means in said enclosure for heating the flow of air before it enters said plenum, a ring-like member having a peripheral side wall and being closingly fitted in said back wall opening, a rotatable scoop-type axial flow fan for causing a substantially axial flow of heated air toward said plenum front wall, said fan having a plurality of generally tear-drop shaped blades and positioned in said peripheral side wall of said ring-like member for drawing a flow of heated air from said enclosure into said plenum, each said blade having a leading edge portion that tapers to a point in the direction of rotation of said fan and a trailing row portion disposed at a given pitch angle, whereby upon rotation of said fan, each said blade leading edge portion scoops a portion of air and its respective said blade trailing row portion forcibly moves said portion of air forwardly in a substantially axial direction toward said plenum front wall, said plenum front wall having a surface thereof tapering from said front wall openings inwardly of said plneum and toward said fan, whereby said tapering surface smoothly and uniformly directs the flow of heated air from said fan into said duct members and out of said nozzles, thereby providing a uniform cooking temperature for a food product on said supporting means, said tapering surface of said front wall having a flat top portion leading at a first angle from said one duct member and a flat bottom portion leading at said first angle from said one duct member, said flat top portion and said flat bottom portion tapering together, whereby the flow of heated air is smoothly and uniformly directed to said one duct member and said one other duct member, said one duct member and said one other duct member extending substantially the width of said plenum, said tapering surface further having a pair of oppositely disposed flat side portions of said front wall and tapering together with said flat top portion and said flat bottom portion inwardly of said plenum, whereby the flow of heated air is smoothly and uniformly directed to and along the width of said duct members, said flat top portion and said flat bottom portion having respective end portions leading from respective said duct members at a third angle greater than said first angle, and wherein said flat side portions have respective end portions leading from respective said sides of said front wall at a fourth angle greater than said second angle to form a multi-tapering surface, whereby the flow of heated air is directed into said duct members substantially along their longitudinal axes.

2. The oven of claim 1 wherein said peripheral sidewall of said ring-like member is arcuately shaped to curve radially outwardly in a direction toward the flow of heated air, thereby providing a smoother flow of air through said backwall opening and into said plenum.

3. The oven of claim 2 wherein the pitch angle of each fan blade increases from the leading edge portion to the trailing row portion and wherein the maximum pitch angle of each said blade trailing row portion is between about 23° to about 25°.

4. The oven of claim 3 further comprising cover means removably attachable to selected ones of said duct members for closing off selected ones of said nozzles.

5. An impingement food preparation oven, comprising:

an enclosure including a cooking chamber adapted for cooking a food product therein, means in said cooking chamber for supporting a food product, a plurality of duct members mounted in said cooking chamber and having a respective plurality of nozzles to direct a respective plurality of streams of air therefrom, at least one of said duct members being spaced above said supporting means with its respective plurality of said nozzles directed downwardly toward said supporting means, and at least one other of said duct members spaced below said supporting means with its respective plurality of said nozzles directed upwardly toward said supporting means, plenum in said enclosure and connected to said duct members to provide a flow of air thereto, said plenum having a front wall with a plurality of openings connected to respective said duct members and a backwall with an opening therein, said plenum front wall having a multi-tapering convex surface tapering from said front wall openings inwardly of said plenum, said multi-tapering surface having a tapering peripheral portion and a tapering center portion that meet at a juncture, said tapering peripheral portion being at a greater inclination towards said front wall openings than said tapering center portion, means in said enclosure for heating the air flow, a ring-like member having a peripheral sidewall and being mounted in said backwall opening, and an axial flow rotatable fan disposed in said peripheral sidewall for directing an axial flow of heated air forwardly from said enclosure into said plenum toward said multi-tapering surface, whereby said multi-tapering surface smoothly and uniformly directs the axial flow of heated air from said fan device into said duct members substantially along their longitudinal axes and out said nozzles, thereby providing a uniform cooking temperature for a food product on said supporting means.

6. The oven of claim 5 wherein said fan device is a rotatable scoop-type fan having a plurality of generally tear-drop shaped blades, each said blade having a leading edge portion tapering to a point in the direction of rotation and a trailing row portion disposed at a predetermined pitch angle, whereby upon rotation of said fan a flow of air is created by each said leading edge portion scooping a generally separate volume of air and its respective said trailing row portion forcibly moving that volume of air in a substantially axial direction towards said plenum front wall, each succeeding one of said blades scooping a separate volume of air different from the preceding one of said blades.

7. The oven of claim 5 wherein said peripheral sidewall of said ring-like member is arcuately shaped to curve radially outwardly in a direction with the flow of heated air, thereby providing a smooth flow of air through said backwall opening and into said plenum.

8. The oven of claim 5 further comprising cover means removably attachable to selected ones of said duct members for closing off selected ones of said nozzles.

9. The oven of claim 5 wherein said tapering peripheral portion includes:
   a flat top section leading at a first angle from said one duct member,
   a flat bottom section leading at said first angle from said one other duct member, and
   a pair of oppositely disposed flat side sections leading at a second angle from respective side portions of said front wall,
   said top section, said bottom section, and said side sections tapering together to said juncture with said tapering center portion.

10. The oven of claim 9 wherein said tapering center portion includes:
    a flat top section leading at a third angle from said juncture,
    a flat bottom section leading at said third angle from said juncture, said third angle being less than said first angle, and
    a pair of oppositely disposed flat side sections leading at a fourth angle from said juncture, said fourth angle being less than said second angle,
    said top section, said bottom section, and said side sections tapering together from said juncture.

11. The oven of claim 10 wherein said fan device is a rotatable scoop-type fan having a plurality of generally tear-drop shaped blades, each said blade having a leading edge portion tapering to a point in the direction of rotation and a trailing row portion disposed at a predetermined pitch angle, whereby upon rotation of said fan a flow of air is created by each said leading edge portion scooping a generally separate volume of air and its respective said trailing row portion forcibly moving that volume of air in a substantially axial direction towards said plenum front wall, each succeeding one of said blades scooping a separate volume of air different from the proceeding one of said blades.

12. The oven of claim 11 wherein the pitch angle of each fan blade increases from the leading edge portion to the trailing row portion and wherein maximum pitch angle of each said blade trailing row portion is between about 23° to about 25°.

13. The oven of claim 12 further comprising cover means removably attachable to selected ones of said duct members for closing off selected ones of said nozzles.

14. The oven of claim 13 wherein said peripheral sidewall of said ring-like member is arcuately shaped to curve radially outwardly in a direction with the flow of heated air, thereby providing a smoother flow of air through said backwall opening and into said plenum.

* * * * *

UNITED STATES PATENT AND TRADEMARK OFFICE
CERTIFICATE OF CORRECTION

PATENT NO. : 4,626,661

DATED : December 2, 1986

INVENTOR(S) : Mitchell C. Henke

It is certified that error appears in the above-identified patent and that said Letters Patent is hereby corrected as shown below:

Claim 1, Col. 8, line 54, change "onve" to --oven--.

Claim 1, Col. 8, line 56, change "ncluding" to --including--.

Claim 1, Col. 9, line 48, after "portions" insert --leading at a second angle from respective opposite side portions--.

Signed and Sealed this

Thirty-first Day of March, 1987

*Attest:*

DONALD J. QUIGG

*Attesting Officer*     *Commissioner of Patents and Trademarks*